United States Patent [19]

Toy et al.

[11] Patent Number: 5,343,498
[45] Date of Patent: Aug. 30, 1994

[54] SAMPLE TIMING SELECTION AND FREQUENCY OFFSET CORRECTION FOR U.S. DIGITAL CELLULAR MOBILE RECEIVERS

[75] Inventors: Raymond L. Toy; Ravinder D. Koilpillai, both of Latham; Sandeep Chennakeshu, Schenectady, all of N.Y.

[73] Assignee: General Electric Company, Schenectady, N.Y.

[21] Appl. No.: 28,016

[22] Filed: Mar. 8, 1993

[51] Int. Cl.[5] ............................................. H04L 27/00
[52] U.S. Cl. ....................... 375/37; 375/106; 375/114; 375/120; 370/105.1; 370/106
[58] Field of Search ............... 375/118, 119, 120, 106, 375/114, 116, 37; 370/100.1, 105.1, 105.2, 105.3, 105.4, 105.5, 106

[56] References Cited

U.S. PATENT DOCUMENTS 5,177,740   1/1993   Toy et al. ..................... 370/100.1

OTHER PUBLICATIONS

"A Bit Synchronization and Timing Sensitivity Viterbi Equalizers for Narrowband TDMA Digital Mobile Radio Systems", A. Baier, G. Heinrich, and U. Wellens, IEEE Vehicular Technology Conference, (Philadelphia), pp. 377-384, 1988.
Pages 85-86 of Jan. '91 EIA/TIA "Interim Standard-Cellular System, Dual Mode Mobile Station-Base Station Compatibility Standard" Publication IS-52-A by the Electronics Industries Assoc.
Pages 533-537 in "Digital Cellular Systems for North America", Roc. Globecom by C. E. W. Sundberg and N. Seshadri, pp. 533-537.
Pages 20-21 of the Mar. 1991 draft of EIA/TIA "Cellular System, Recommended Minimum Performance Standards for 800 MHz Dual-Mode Mobile Stations" Publication TIA TR45.3, Project No. 2216 by the Electronics Industries Assoc., Engineering Dept.

Primary Examiner—Stephen Chin
Assistant Examiner—Hai H. Phan
Attorney, Agent, or Firm—Lawrence P. Zale; Marvin Snyder

[57] ABSTRACT

A Time Division Multiple Access (TDMA) radio system achieves synchronization by performing a two-step synchronization. A simplified frame/slot synchronization is followed by a symbol synchronization of higher accuracy. This symbol timing is passed to a frequency offset unit which determines the amount of frequency drift between the transmitter and receiver and compensates for the frequency drift. This results in improved receiver performance for the TDMA digital radio system.

9 Claims, 5 Drawing Sheets

SAMPLE TIMING SELECTION AND FREQUENCY OFFSET CORRECTION FOR U.S. DIGITAL CELLULAR MOBILE RECEIVERS

CROSS-REFERENCE TO RELATED APPLICATIONS

This application is related to the following U.S. patent applications assigned to the present assignee: H. Lester et al. Ser. No. 07/754,471 and continuation-in-part application Ser. No. 08/095,367 filed Jul. 20, 1993 "Automatic Simulcast Alignment"; and R. Toy, et al. U.S. Pat. No. 5,177,740 issued Jan. 5, 1993 "Frame/Slot Synchronization for U.S. Digital Cellular TDMA Radio Telephone System".

BACKGROUND OF THE INVENTION

1. Field of the Invention

This invention relates generally to a telecommunication method and apparatus and, in particular, to method and apparatus for achieving sample timing selection and frequency offset correction in conjunction with transmitting digital information in a Time Division Multiple Access (TDMA) cellular radio telephone system.

2. Description of Prior Art

Mobile radio involves communication via transmission of radio frequency signal between a mobile unit in a vehicle and a base station, or between mobile units. Time division multiple access (TDMA) digital mobile radio systems are described in the aforementioned "Frame/Slot Synchronization for U.S. Digital Cellular TDMA Radio Telephone Systems" by R. L. Toy and S. Chennakeshu, and "A Bit Synchronization and Timing Sensitivity Viterbi Equalizers for Narrowband TDMA Digital Mobile Radio Systems", A. Baier, G. Heinrich, and U. Wellens, IEEE *Vehicular Technology Conference*, (Philadelphia), pp. 377–384, 1988. The communicating units must determine the beginning and end of signals intended for them, known as frame/slot synchronization. The complexity and accuracy of the frame/slot synchronization depend upon the number of points at which the signal is sampled. More samples per transmitted symbol implies greater accuracy at the expense of a higher complexity.

In order to keep the complexity reasonable for a practical implementation, fewer samples per symbol are employed for establishing frame/slot synchronization. The reduced number of samples, however, results in reduced accuracy with which frame/slot synchronization can be established. The resulting inaccuracy degrades receiver performance. Thus a more accurate sample timing scheme is required.

The transmitted signal may be reflected from physical and natural obstructions causing echoes which are received with the original transmission and is commonly known as multipath propagation. Multipath propagation further reduces receiver performance.

An additional problem with these systems is that the frequency of a local oscillator in the mobile station is likely to differ from that of the base station, and vice versa. The resulting frequency offset introduces a phase shift which causes the transmitted symbols to appear to be phase rotated at the receiver, thereby causing an ambiguity in the detection process. This severely degrades the performance of the receiver. In order to counteract this degradation in performance, it is necessary to estimate this frequency offset and apply a suitable correction to the received symbols.

Currently there is a need for a TDMA digital radio system which accurately selects sample timing for synchronization and corrects frequency offset in the presence of multipath propagation.

OBJECTS OF THE INVENTION

It is an object of the invention to provide a simplified method and apparatus, relative to the prior art, for achieving symbol synchronization in time division multiple access (TDMA) radio systems in the presence of multipath propagation.

It is another object of the invention to provide a method and apparatus for achieving and maintaining symbol synchronization in the U.S. digital cellular radio system and that corrects frequency offsets between a transmitter and a receiver even in the presence of multipath propagation.

SUMMARY OF THE INVENTION

A digital communication system comprises a transmitter for transmitting reference symbols and data symbols in a radio signal, and a receiver for decoding the signal. In the receiver, a transmit oscillator governs the frequency of the transmitted digital radio signal. An analog-to-digital (A/D) converter samples the transmitted radio signal to provide a plurality of received reference sample sets $r_{pre}^{(k)}(n)$ corresponding to transmitted reference symbols and a plurality of data sample sets $r_{sp}^{(k)}(n)$ corresponding to transmitted data symbols.

A synchronizer estimates channel impulse response (CIR) coefficients $c_i$ from the received reference samples and a set of stored reference symbols and creates a set of estimated reference symbols $\hat{r}^{(k)}(n)$ which are compared to received reference samples $r_{pre}^{(k)}(n)$. Based upon the comparison, a sample timing is selected which minimizes the difference. A frequency offset means receives the estimated reference samples $\hat{r}^{(k)}(n)$ and received reference samples $r_{pre}^{(k)}(n)$ to determine frequency drift between the transmitter oscillator and the receiver oscillator. This frequency drift estimate is used to correct a data sample set corresponding to a best sample timing by a frequency correction means. A decoder decodes the corrected data sample set into digital information which is then utilized by an output device.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
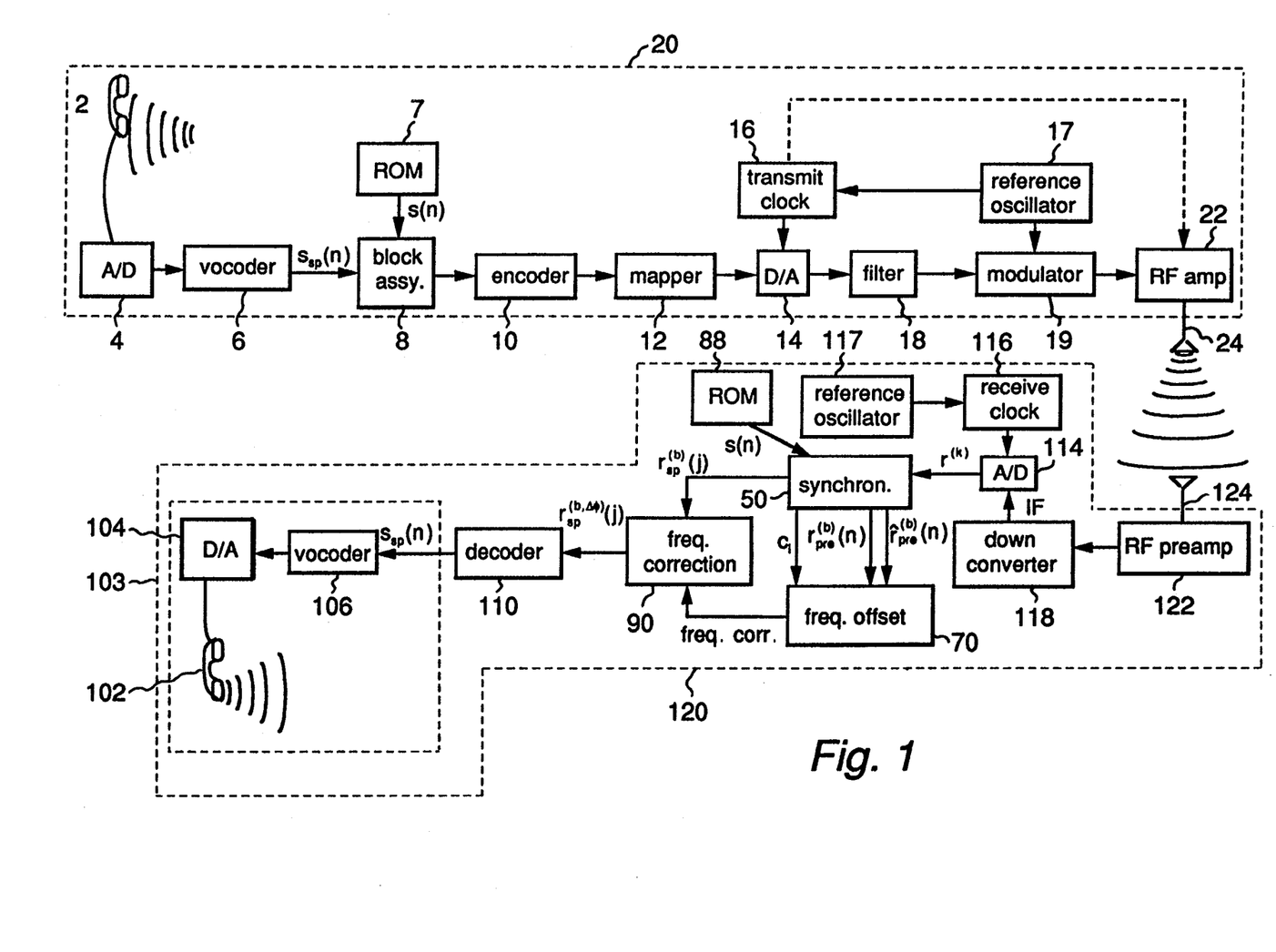
FIG. 1 is simplified block diagram of a digital radio communication system according to the present invention.

FIG. 1 is a block diagram of the present invention showing a transmitter 20 and a receiver 120. Digital information desired to be transmitted is provided to a block assembly unit 8. The digital information may be digitized speech data from an operator speaking into a handset 2 to create an analog voltage signal that is sampled by an analog to digital (A/D) converter 4 and analyzed by a vocoder 6 to provide coded speech data to a block assembly unit 8. Block assembly unit 8 combines coded speech data, reference symbols s(n) from a symbol storage unit 7, and other required data in a standardized format into a slot of data which is later interleaved with other data slots to be employed in a time division multiple access (TDMA) system.

Encoder 10 of FIG. 1 encodes the slot of data in a desired manner and passes the encoded data to a mapper 12 which maps several bits to a symbol of a predetermined symbol constellation. Mapped symbols are provided to a digital to analog (D/A) converter 14 which converts the mapped samples to an analog signal at a rate governed by a transmit clock 16 and reference oscillator 17. The analog signal is then filtered by bandpass filter 18 and passed to a radio frequency (RF) amplifier 22 which creates an RF signal transmitted through antenna 24.

Figure 2:
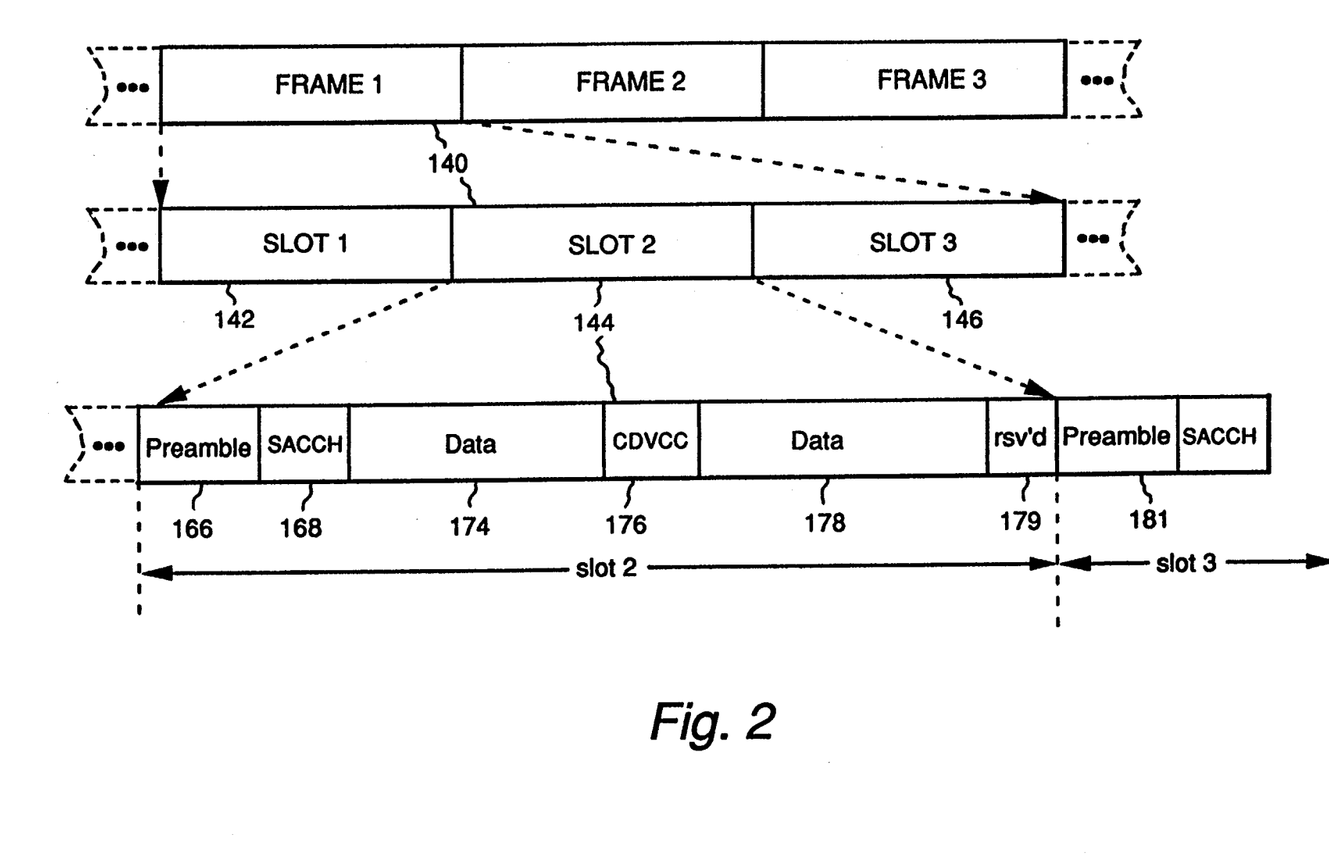
FIG. 2 is an illustration of the frame/slot data format for a U.S. digital cellular time division multiple access (TDMA) telephone systems.

The transmitted signal is sensed by a receiving antenna 124, passed to an RF preamplifier 122 and heterodyned by a down converter 118 to provide an intermediate frequency (IF) signal. An A/D converter 114 in the receiver samples the IF signal at a rate determined by a receive clock 116 and reference oscillator 117, resulting in a plurality of received reference samples $r_{sp}^{(k)}(n)$ (n=1,2, ... $N_p$), where $N_p$ is the number of symbols in the reference symbol set) and data samples $r_{sp}^{(k)}(j)$ (j=1,2, ... $N_d$,) where $N_d$ is the number of data symbols) corresponding to samples of reference symbols and data symbols, respectively. A/D converter 114 samples at a rate to provide a plurality of samples for each symbol, each acquired at a different sample timing k measured from the beginning of a symbol period. Samples obtained at a given sample timing offset k for all symbol periods comprise a sample set. The samples are provided to a synchronization unit 50, coupled to a reference symbol storage unit shown as ROM 88, adapted for retaining predetermined reference symbols being the same as:

1) the symbols of preamble 166 or Coded digital Verification Color Code (CDVCC) data 176 shown in FIG. 2 and described on p. 85-86 of Jan. '91 EIA/TIA "Interim Standard—Cellular System, Dual Mode Mobile Station—Base Station Compatibility Standard" Publication IS-54-A by the Electronics Industries Assoc., Engineering Dept., and
2) reference symbols combined with data symbols by block assembly unit 8 of FIG. 1.

Synchronization unit 50 analyzes and compares each of the received reference sample sets it receives from A/D converter 114 to that of ROM 88 and determines a sample timing k=b corresponding to a best match. Data samples $r_{sp}^{(b)}(j)$ corresponding to the best sampling timing b are passed to frequency correction unit 90. Synchronization unit 50 also estimates preamble data $\hat{r}^{(k)}(n)$ derived from reference symbols s(n) of ROM 88 as they would appear after being transmitted and received by receiver 120, and provides received reference samples $r_{pre}^{(b)}(n)$ to a frequency offset unit 70. Frequency offset unit 70 then determines a frequency offset $\Delta\phi$ which represents the phase drift between transmit oscillator 17 and receive oscillator 117. Synchronization unit 50 also selects data samples $r_{sp}^{(b)}(j)$ corresponding to the best sample timing b (as defined hereinafter) and provides these to a frequency correction unit 90. Frequency correction unit 90 employs frequency offset $\Delta\phi$ and data samples $r_{sp}^{(b)}(j)$ to compensate for the frequency offset, creating adjusted data samples $r_{sp}^{(b,\Delta\phi)}(j)$ and provide them to a decoder 110. Decoder 110 decodes the adjusted data samples into digital information to be utilized by an output device. The output device in this embodiment is a vocoder 106 which synthesizes digital speech waveforms. A D/A converter 104 converts the digital speech waveforms into analog speech at handset 102. The output device may be any device which may make use of digital information.

FIG. 2 shows a typical slot of data 144 (slot 2) which comprises a preamble 166, a slow associated control channel (SACCH) data block 168, the encoded data 174 and 178 (which may be encoded speech data), a coded digital verification color code (CDVCC) block of data 176 and a reserved block of data 179. Three slots together comprise a frame 140. This frame/slot structure has been described on pp. 533–537 in "Digital Cellular Systems for North America", ROC. GLOBECOM by C.E. W. Sundberg and N. Seshadri, ", PP. 533–537.

Sample Timing Selection

At the mobile station receiver, the data is received and sampled using $N_s$ samples per symbol. To reduce complexity, frame/slot synchronization is computed with fewer samples per symbol, such as $N_{s1}$. Because of the lower sampling rate, the accuracy of the synchronization is reduced to $\pm(N_s/N_{s1})$ samples from the true synchronization point $t_0$. This is adequate for frame/slot synchronization, but the inaccuracy degrades the performance of the receiver. Thus, more accurate sample timing selection leads to higher receiver performance.

For a general Time Division Multiple Access (TDMA) system, the sample timing selection should be chosen as close to an optimum sampling point as possible to optimize the performance of the receiver. The optimum sampling point is selected from one of the possible points sampled at time $t_k$.

$$t_k = t_0 + \frac{kT_s}{N_s} \quad (1)$$

where k is the sampling point with k=0, ±1, ±2 ... ,±[$N_s N_{s1}$], $T_s$ is the symbol period, $t_0$ is the sample location obtained by a coarse frame/slot synchronization, $N_s$ is the number of samples per symbol.

Figure 3:
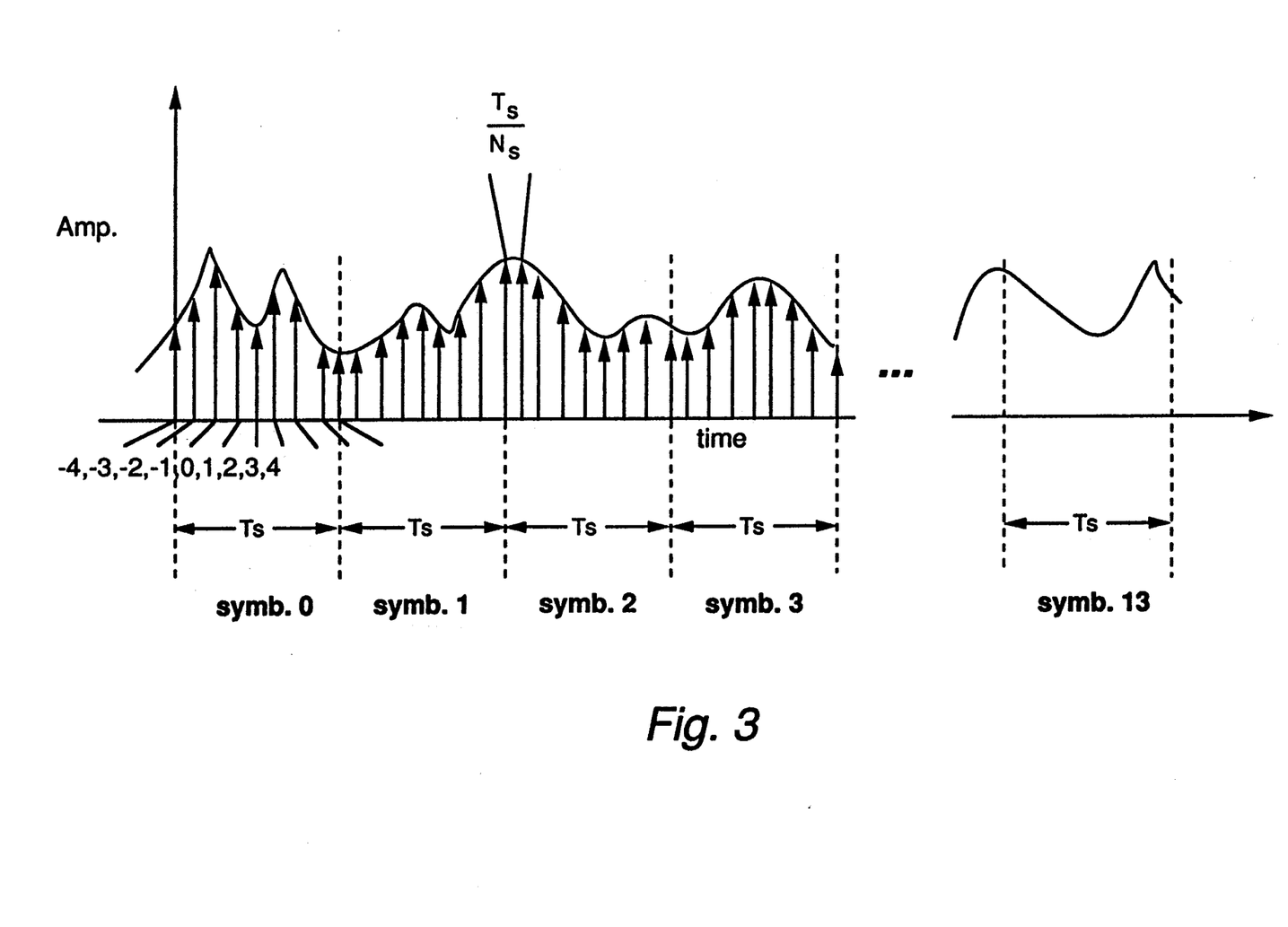
FIG. 3 is an illustration of a method of sampling of an analog intermediate frequency signal compatible with the present invention.

FIG. 3 is an illustration of a method of sampling the IF signal received by A/D converter 114, shown in FIG. 1, which is compatible with the present invention. A/D Converter 114 samples the IF signal at a rate several times higher than the symbol rate with a sampling period of $T_s/N_s$. In the preferred embodiment, $N_s$ equals 8 samples per symbol numbered from −4 to 4 with the sample labeled 0 being a coarse sample timing at time $t_0$.

Ultimately, the best sample timing b within each symbol should be chosen to minimize the calculated error between a set of received reference samples $r_{pre}^{(k)}(n)$ which may be samples of preamble symbols 166, 181 in successive slots such as slots 2 and 3 of FIG. 2, and a set of estimated reference samples $\hat{r}^{(k)}(n)$ calculated from stored reference symbols s(n). This may be stated as:

$$\min_{k} \sum_{n=1}^{N_p} |r_{pre}^{(k)}(n) - \hat{r}^{(k)}(n)|^2 \qquad (2)$$

where $N_p$ is the number of symbols in the preamble, k is the sample index, and $r_{pre}^{(k)}(n)$ is the sample of nth symbol of preamble corresponding to sampling instant k.

The estimated reference samples $\hat{r}^{(k)}(n)$ are an estimate of stored reference symbols s(n) as they would appear if transmitted through the channel. The estimated reference samples $\hat{r}^{(k)}(n)$ are calculated by:

$$\hat{r}^{(k)}(n) = \sum_{i=1}^{L} c_i^{(k)} s(n - i + 1) \qquad (3)$$

where

L is the duration of the (finite) channel impulse response (CIR), corresponding to the multipath channel;

$c_i^{(k)}$ are the coefficients, each being a complex number signifying the estimated gain for the $i^{th}$ reflected radio path corresponding to the $k^{th}$ sampling instant in each symbol over the preamble, and s(n) represents the $n^{th}$ reference symbol of the preamble.

The value of k that minimizes Eq. (2) is the optimum or best sample timing b. Thus, the set of samples $\hat{r}^{(b)}(n)$ corresponding to the best sample timing b are decoded in the receiver. The samples at other sample timings are discarded.

Eq. (3) requires that the CIR coefficients be calculated before determining the estimated reference symbols $\hat{r}^{(b)}(n)$ and performing the sample timing selection.

For the U.S. digital cellular system, the preamble is 14 symbols long, and the multipath channel is characterized by a two-ray channel model with the two rays being separated by a maximum of 1 symbol as described on p. 20–21 of the March 1991 draft of EIA/TIA "Cellular System, Recommended Minimum Performance Standards for 800 MHz Dual-Mode Mobile Stations" Publication TIA TR45.3, Project No. 2216 by the Electronics Industries Assoc., Engineering Dept.. Also, assuming that $N_s = 8$ samples per symbol, and $N_{s1} = 2$ samples per symbol, then, there are nine possible sampling points according to Eq. (1).

In this case, the equations (2) and (3) become $$\min_{k=0,\pm1,\pm2,\pm3,\pm4} \sum_{n=1}^{14} |r_{pre}^{(k)}(n) - \hat{r}^{(k)}(n)|^2 \qquad (4)$$

and $$\hat{r}^{(k)}(n) = c_1^{(k)} s(n) + c_2^{(k)} s(n-1), \qquad (5)$$

respectively.

CIR Coefficient Estimation

An estimate of the CIR coefficients is required for computing the estimated received signal in Eq. (3).

As described above, the preamble has length $N_p$, and the CIR has length L. To simplify the expressions, equation (3) may be expressed in matrix form as the following matrices:

$$S = \begin{bmatrix} s(L) & \cdots & s(1) \\ s(L+1) & \cdots & s(2) \\ \vdots & & \vdots \\ s(N_p) & \cdots & s(N_p - L + 1) \end{bmatrix} \qquad (6)$$

$$C^{(k)} = \begin{bmatrix} c_1^{(k)} \\ c_2^{(k)} \\ \vdots \\ c_L^{(k)} \end{bmatrix} \qquad (7)$$

$$R^{(k)} = \begin{bmatrix} r_{pre}^{(k)}(L) \\ r_{pre}^{(k)}(L+1) \\ \vdots \\ r_{pre}^{(k)}(N_p) \end{bmatrix} \qquad (8)$$

where S is the $(N_p - L + 1) \times L$ matrix of known symbols, $C^{(k)}$ is the L-vector of channel coefficients, and $R^{(k)}$ is the vector of received samples of length $N_p - L + 1$.

Equation (3) then becomes the matrix equation $$SC^{(k)} = R^{(k)} \qquad (9)$$

This is an over-determined set of $N_p - L + 1$ equations in the L unknowns, $C^{(k)}$. To obtain a solution, a least-squares technique is performed, resulting in:

$$C^{(k)} = MR^{(k)} \qquad (10)$$

where $$M = [S^H S]^{-1} S^H \qquad (11)$$

$S^H$ denotes the Hermitian transpose (conjugate transpose) of S. Since S is known a priori, M can be computed beforehand without the need for received symbols.

For the U.S. digital cellular system, Eqs. (10) and (11) cannot be directly applied since each symbol is differentially encoded (i.e. transmitted as a difference in phase from a previously transmitted symbol). Thus, for the preamble, the fourteen differential phase angles given by the set $\{\Delta\Phi_1, \Delta\Phi_2, \ldots, \Delta\Phi_{14}\}$ are known, but the actual transmitted symbols are not. However, if an arbitrary starting symbol $\tilde{s}(0)$ is assumed, the remaining preamble symbols may be determined by: $\tilde{s}(n) = \tilde{s}(n-1) e^{j\Delta\Phi_n}$ If s(0) is the actual starting symbol, then:

$$\tilde{s}(0) = e^{j\pi l/2}s(0), l=0,1,2,3 \quad (12)$$

Applying this assumption to Eqs. (10) and (11), then:

$$\tilde{M} = e^{-j\pi l/2}[S^H S]^{-1}S^H \quad (13)$$
$$= e^{-j\pi l/2}M$$

$$\tilde{C}^{(k)} = e^{-j\pi l/2}C^{(k)} \quad (14)$$

Thus, the CIR estimate is rotated by a factor of $e^{-j\pi l/2}$ from the true CIR values. However, when we form the estimated received signal, $\tilde{R}^{(k)}$, it is correct.

$$\tilde{R}^{(k)} = e^{j\pi l/2}Se^{-j\pi l/2}C^{(k)} \quad (15)$$
$$= R^{(k)} \quad (16)$$

The only effect of the above factor $e^{-j\pi l/2}$ will be that the decoded symbols will have a constant phase shift of $\pi l/2$. Differential decoders, such as those used in U.S. digital cellular radio systems to demodulate $\pi/4$-shifted Differentially Quadrature Phase Shift Keying (DQPSK) signals, only measure the phase differences between a transmitted phase angle and a previously transmitted phase angle, and not the actual phases. Therefore, the differential decoder will remove the effect of this constant phase shift.

Since $\tilde{s}(0)$ is implicitly employed, the following additional equation may inserted from Eq. (9):

$$[s(L-1) \ldots s(0)] \begin{bmatrix} c_1^{(k)} \\ c_2^{(k)} \\ \cdot \\ \cdot \\ \cdot \\ c_L^{(k)} \end{bmatrix} = [r_{pre}^{(k)}(L-1)]. \quad (17)$$

This additional equation helps to improve the accuracy of the CIR estimate, especially over the short CDVCC words.

The U.S. digital cellular system typically assumes a two-ray ray model for the channel. Hence, L=2, and Eq. (9) becomes:

$$\begin{bmatrix} s(1) & s(0) \\ s(2) & s(1) \\ \cdot & \cdot \\ \cdot & \cdot \\ \cdot & \cdot \\ s(14) & s(13) \end{bmatrix} \begin{bmatrix} c_1^{(k)} \\ c_2^{(k)} \end{bmatrix} = \begin{bmatrix} r_{pre}^{(k)}(1) \\ r_{pre}^{(k)}(2) \\ \cdot \\ \cdot \\ \cdot \\ r_{pre}^{(k)}(14) \end{bmatrix} \quad (18)$$

where the additional Eq. (17) is employed. For the CDVCC, which consists of six symbols, the equations become:

$$\begin{bmatrix} s(1) & s(0) \\ s(2) & s(1) \\ \cdot & \cdot \\ \cdot & \cdot \\ \cdot & \cdot \\ s(6) & s(5) \end{bmatrix} \begin{bmatrix} c_1^{(k)} \\ c_2^{(k)} \end{bmatrix} = \begin{bmatrix} r_{pre}^{(k)}(1) \\ r_{pre}^{(k)}(2) \\ \cdot \\ \cdot \\ \cdot \\ r_{pre}^{(k)}(6) \end{bmatrix} \quad (19)$$

where s(n) is now the reference symbol from the CDVCC word. The CIR estimated is obtained from equation 10.

Figure 4:
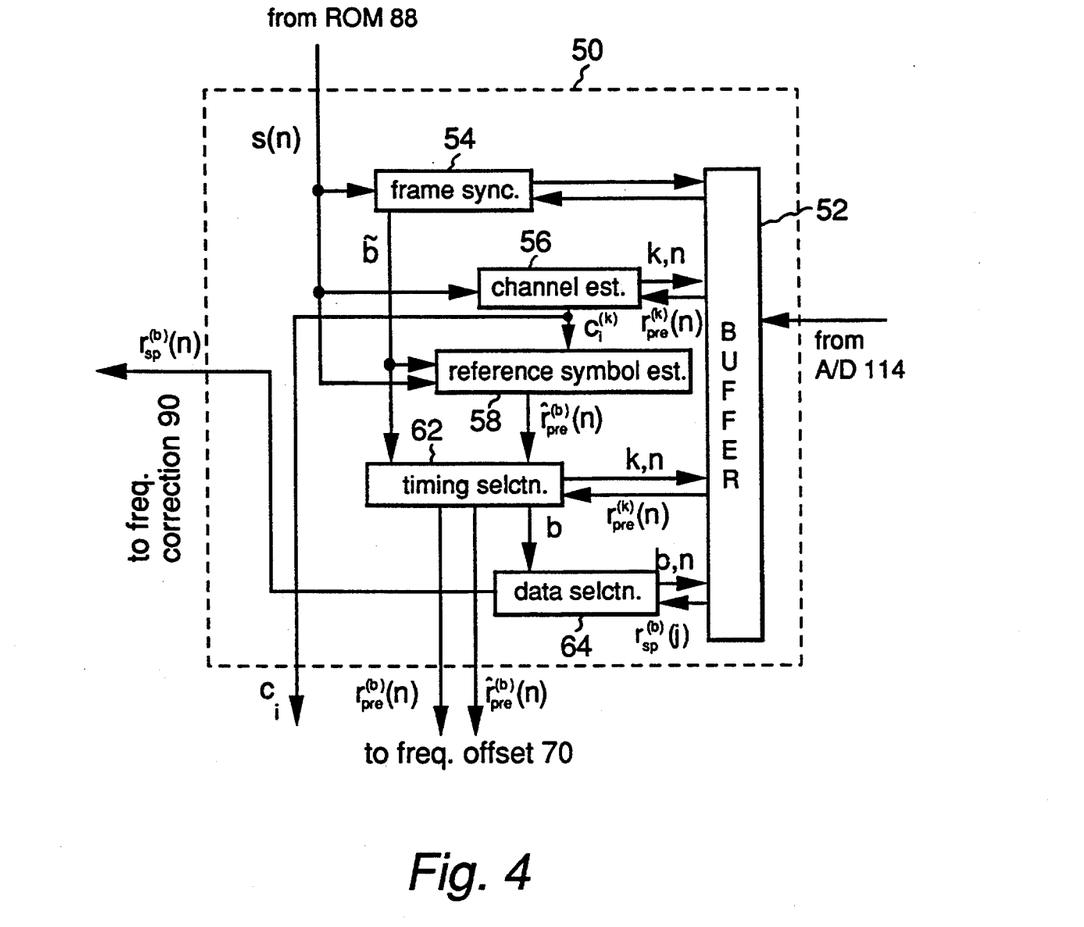
FIG. 4 is a more detailed block diagram of synchronization unit 50 of FIG. 1.

In FIG. 4, a more detailed block diagram of synchronization unit 50 of FIG. 1 is shown using $N_s$ samples per symbol for each of the reference symbols (i.e., preamble, but in some embodiments over several preambles and other reference features), and each of the data symbols (174, 178 of FIG. 2) are stored in a buffer 52. A frame synchronization unit 54 provides a coarse sample timing $\tilde{b}$.

A channel estimator 56 receives stored reference symbols s(n) from ROM 88 and received reference samples from buffer 52 and determines channel impulse response (CIR) coefficients $c_i$ which are provided to a reference symbol estimator 58. The coarse symbol timing $\tilde{b}$ from frame synchronization unit 54 is also provided to reference symbol estimator 58 which determines estimated reference samples $\hat{r}^{(k)}(n)$ and passes them to a timing selection unit 62. Timing selection unit 62 compares a received reference sample $r_{pre}^{(k)}(n)$ from buffer 52 to the corresponding estimated reference sample $\hat{r}^{(k)}(n)$ from reference symbol estimator 58. Timing selection unit 62 repeats this process for all symbols in the preamble and determines a deviation of received reference samples $r_{pre}^{(k)}(n)$ from the estimated reference samples $\hat{r}^{(k)}(n)$ according to Eq. (2). This deviation is determined for a given sample timing k. This process is then repeated for all other values of k in a predetermined window spanning the symbol timing centered at coarse sample timing $\tilde{b}$. In the preferred embodiment, the sample timing k will vary from four samples before coarse symbol timing $\tilde{b}$ to four samples after the coarse symbol timing. The sample timing corresponding to the least deviation between the estimated reference samples $\hat{r}^{(k)}(n)$ and the actual received samples $r_{pre}^{(k)}(n)$ is used as the best sample timing b.

The received reference samples $r_{pre}^{(b)}(n)$ and the estimated reference samples $\hat{r}^{(b)}(n)$ corresponding to best sample timing index b are passed from timing selection unit 62 to frequency offset unit 70 of FIG. 1. Sample timing index b is passed to a data selection unit 64 which selects received data samples $r_{sp}^{(b)}(n)$ for decoding from buffer 52 and passes them to frequency correction unit 90 of FIG. 1.

Frequency Offset Correction

Let $\phi_o(n)$ be the received signal phase at time n when no frequency offset is present. When a frequency offset of $f_0$ Hz is present, the received signal phase has an additional phase component that causes each successive symbol to be rotated an additional $\Delta\phi = 2\pi f_o T_s$ radians per symbol, where $T_s$ is the symbol period. Let $\phi(n)$ be the received signal phase with frequency offset. Then $\phi(n) = \phi_o(n) + n\Delta\phi + \Delta\phi_o$ is a constant frequency offset due to the unknown phase relationship between the transmit oscillator 17 and the receive oscillator 117 of FIG. 1. This offset cannot be ignored because it appears in the estimates of the channel impulse response that are required for synchronization.

The goal is to estimate $\Delta\phi$ so that the appropriate frequency correction may be applied to remove the effects of the frequency offset.

Estimation via Phase Adjustment Loops

Figure 5:
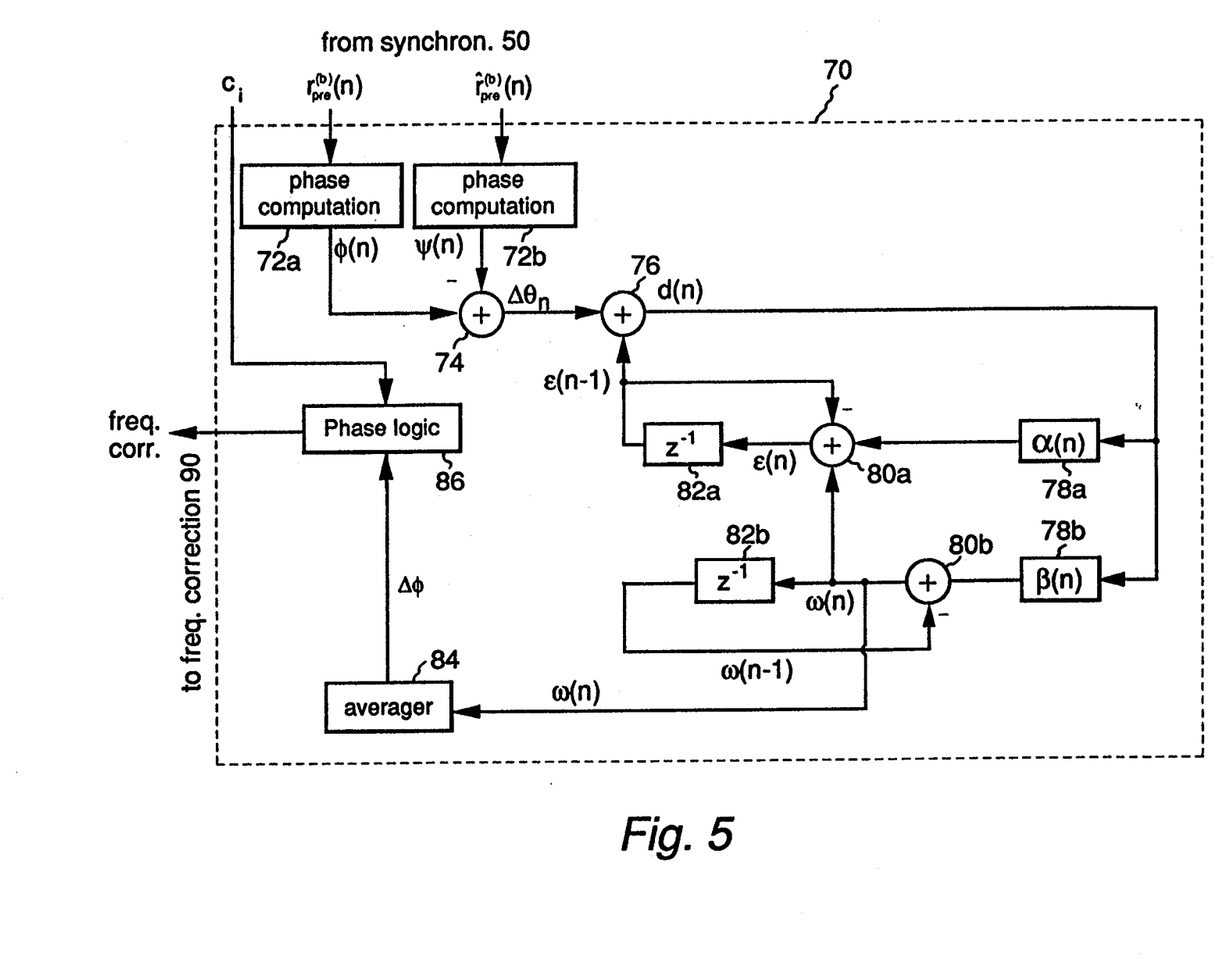
FIG. 5 is a more detailed block diagram of frequency offset unit 70 of FIG. 1.

Frequency offset estimation can be performed using phase adjustment loops (PALs). Frequency offset unit 70 of FIG. 1, which acts as a PAL, is illustrated in a more detailed block diagram in FIG. 5. The received reference samples $r_{pre}^{(b)}(n)$ and estimated reference samples $\hat{r}^{(b)}(n)$ corresponding to the best sample timing index b are provided to phase computation units 72a and 72b to produce phases $\phi(n)$ and $\psi(n)$ which are provided to summer 74. The difference in phase $\Delta\theta_n$ produced by a summer 74 and a feedback signal $\epsilon(n-1)$ are provided to a summer circuit 76. The output signal $d(n)$ of summer 76 is multiplied by factors $\alpha$ and $\beta$ in gain units 78a and 78b, respectively to adjust the signal's gain. The gain adjusted samples from gain unit 78a are provided to a summer 80a along with feedback signal $\epsilon(n-1)$ and a signal $\omega(n)$ to create the signal $\epsilon(n)$ which is delayed in a delay unit 82a to produce the feedback signal $\epsilon(n-1)$. The output signal of gain unit 78b is provided to a summer 80(b) to determine the difference between this signal and the feedback signal $\omega(n-1)$ of a delay unit 82b. The output signal $\omega(n)$ produced by summer 80b is passed to an averager circuit 84 to determine a signal $\Delta\hat{\phi}$ which is an estimate of the phase adjustment for the phase difference between transmit oscillator 17 and receive oscillator 117 of FIG. 1. Frequency correction unit 90 of FIGS. 1 and 5 employed in the preferred embodiment of the present invention may be described by:

$$\psi(n) = \arg\left[\sum_{i=1}^{L} c_i s(n-i+1)\right] \quad (20)$$

$$d(n) = \phi(n) - \psi(n) - \epsilon(n-1) \quad (21)$$
$$\omega(n) = \omega(n-1) + \beta(n)d(n) \quad (22)$$
$$\epsilon(n) = \epsilon(n-1) + \omega(n) + \alpha(n)d(n) \quad (23)$$

where $\psi(n)$, $\phi(n)$ = the phase angles of the complex received reference samples $r_{pre}^{(k)}(n)$ and the estimated reference samples $\hat{r}^{(k)}(n)$, respectively, $\alpha(n), \beta(n)$ PAL filter coefficients, which can be time varying, $c_i$ = channel coefficients, L = length of channel impulse response, and $s(n)$ = reference symbols.

For proper operation, the PAL must be designed with appropriate coefficients. If the channel coefficients, $c_i$ are assumed to be known exactly, if there are no other components in the intersymbol interference, and if there is no noise, then $\phi(n) - \psi(n)$ must contain only the frequency offset component. It can be shown that for a frequency offset of $\Delta\phi$ radians per symbol, $\omega(n) \to \Delta\phi$ as $n \to \infty$. Thus, $\omega(n)$ is an estimate of the frequency offset.

In practice, noise is present, the channel coefficients are not known precisely, and n cannot grow indefinitely. However, for the U.S. digital cellular system, since the preamble symbols $s(n)$ are known, the CIR coefficients $c_i$ can be estimated over the preamble, and the preamble is sufficiently long to obtain an estimate of the frequency offset $\Delta\phi$.

Let the preamble contain $N_p$ symbols. While $\omega(N_p)$ can be used as the estimated frequency offset, $\omega(N_p)$ tends to be rather noisy. To combat the noise, $\omega(n)$ is averaged by an averager 84 of FIG. 5 over the last few symbols of the preamble to produce the frequency offset per symbol, $\Delta\hat{\phi}$:

$$\Delta\hat{\phi} = \frac{1}{N_p - N_1 + 1} \sum_{n=N_1}^{N_p} \omega(n). \quad (24)$$

Therefore in a first embodiment, $\omega(n)$ is averaged by averager 84 and passed to a phase logic circuit 86 which simply sets a frequency correction to the frequency offset $\Delta\hat{\phi}$. Although the sum shown here employs $N_p - N_1 + 1$ symbols, where $N_1 - 1$ is the number of symbols skipped at the beginning of the reference symbol set, the number of symbols employed may vary. $N_1 - 1$ symbols are skipped to allow the phase locked loop to stabilize. More symbols (smaller $N_1$), reduces the effect of noise but introduces more frequency offset estimation error because $\omega(n)$ ramps up from zero to $\Delta\phi$. Fewer symbols (larger $N_1$) reduces the frequency offset estimation error due to the ramping up of $\omega(n)$, but results in noisy estimates. A reasonable tradeoff, depending on the length of the preamble, is to use the last half of the preamble for averaging $\omega(n)$.

Due to channel impairments, this estimate can sometimes produce widely varying values, which is contrary to the constant frequency offset that would be expected. Thus, an averaging filter is employed to further improve the estimates. Let $\Delta\hat{\phi}(m)$ be the estimated frequency offset for slot m, and let $\Delta\hat{\phi}_s(m)$ be the smoothed frequency offset. Then $$\Delta\hat{\phi}_s(m) = \Delta\hat{\phi}_s(m-1) + s(m)[\Delta\hat{\phi}(m) - \Delta\hat{\phi}_s(m-1)] \quad (25)$$

where $s(m)$ is a weighting coefficient determined by $s(m) = \max(s_0, \lambda^m)$, where $s(m)$ is the larger of $s_0$ being a constant representing a minimum threshold value, and $\lambda$ raised to a power m, where m is the slot index. $\lambda$ is a constant representing smoothing factor. Essentially, $s(m)$ is an exponentially decreasing function which weights frequency offsets from recent preambles more than those obtained from subsequent preambles to a minimum amount determined by $s_0$. Suggested values are $s_0 = 0.05$ and $\lambda = 0.7$ which were determined to be a suitable tradeoff between the time to acquire the frequency offset and accurate tracking of the offset. To initialize the smoothing at $m = 0$, $\Delta\hat{\phi}_s(0) = 0$ $\Delta\hat{\phi}_s(-1) = 0$.

In a second embodiment, phase logic circuit 86 sets a frequency correction to the smoothed frequency offset calculated from the estimated frequency offset $\Delta\hat{\phi}(m)$ for slot m calculated according to Eq. (24).

Enhanced Frequency Offset Correction

The development above assumed that only one estimate, $\Delta\hat{\phi}_1$ is obtained from the first preamble. However, for the U.S. digital cellular system, another estimate on base-mobile transmission $\Delta\hat{\phi}_2$ may be obtained from the preamble of the adjoining slot. The use of this second preamble requires continuous transmission from the base station to the mobile unit.

Phase logic circuit 86 receives the frequency offsets $\Delta\hat{\phi}_1$ and $\Delta\hat{\phi}_2$ each determined by average 84 according to Eq. (24) and combines them into a single estimated frequency offset.

In a third embodiment, phase logic circuit 86 combines the estimated frequency offsets according to:

$$\Delta\hat{\phi}(m) = \frac{\Delta\hat{\phi}_1(m) + \Delta\hat{\phi}_2(m)}{2} \qquad (26)$$

Phase logic circuit 86 then employs the single estimated frequency offset of Eq. (26) in Eq. (25) to result in a smoothed frequency offset passed on as the frequency correction.

In a fourth embodiment, phase logic circuit 86 selects the the more reliable estimate of the frequency offset $\Delta\hat{\phi}(m)$ based on the slot containing more energy over the preamble. Specifically, let $c_{i1}$ and $c_{i2}$ for $i=0,1,\ldots,L-1$ be the channel coefficients from the preamble of the current slot and the preamble of the adjoining slot, respectively.

Then the estimated frequency offset to be employed in Eq. (25) is:

$$\Delta\hat{\phi}(m) = \begin{cases} \Delta\hat{\phi}_1(m), & \text{if } \sum_{i=1}^{L} |c_{i1}|^2 \geq \sum_{i=1}^{L} |c_{i2}|^2 \\ \Delta\hat{\phi}_2(m), & \text{otherwise.} \end{cases} \qquad (27)$$

Eq. (27) selects the estimate corresponding to the reference samples with the greater received signal energy. As before, phase logic circuit 86 sets frequency correction to the smoothed frequency offset of Eq. (25).

In a fifth and preferred embodiment, phase logic circuit 86 selects the frequency offset estimate that is closer to smoothed frequency offset. That is, $$\Delta\hat{\phi}(m) = \begin{cases} \Delta\hat{\phi}_1(m), & \text{if } |\Delta\hat{\phi}_1(m) - \Delta\hat{\phi}_s(m-1)| < |\Delta\hat{\phi}_2(m) - \Delta\hat{\phi}_s(m-1)| \\ \Delta\hat{\phi}_2(m), & \text{otherwise} \end{cases} \qquad (28)$$

In this case, the past history, contained in $\Delta\hat{\phi}_s$, is used to select the estimate that is consistent with the past. The new frequency offset is used to produce a new smoothed frequency offset via equation (25).

All of these techniques have been tested in conjunction with a Viterbi equalizer decoder using a two-tap channel model, L=2, for the U.S. digital cellular system. In this system, $N_p=14$, so $N_1=8$ was selected in Eq. (24) for smoothing $\omega(n)$. The preferred technique is the approach expressed in equation (28). In tests with the Viterbi equalizer, this technique successfully removed the effect of the frequency offset so that performance was nearly identical to the case with no frequency offset.

Extensions to the Method

Sample timing selection is performed based upon reference symbols s(n) from preamble 166 of a TDMA slot as shown in FIG. 2. For U.S. digital cellular systems, additional information may be obtained from other portions of the TDMA slot such as the CDVCC 176 and the preamble 181 of the adjoining slot (slot 3 in this example), assuming continuous transmission from the base station to the mobile receiver. This can be used to improve the sample timing selection. Furthermore, different sample timing may be used for decoding different segments of the TDMA slot. For example, the second half of the slot can use the sample timing obtained from a subsequent adjoining preamble. The performance of the receiver should be improved by these techniques.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A digital communication system comprising:
 a) a transmitter having a transmit clock, the transmitter for transmitting in a communication signal, a plurality of $N_p$ reference symbols and $N_s$ data symbols as a data slot with an initial phase governed by the transmit clock; and
 b) a receiver comprising:
  i. a down converter for receiving the transmitted reference and data symbols;
  ii. a receive clock;
  iii. an analog-to-digital (A/D) converter coupled to the receive clock, and down converter for sampling the transmitted reference symbols and data symbols to generate a received reference sample set $r_{pr}^{(k)}(n)$ (n=1,2,3, ... $N_p$) and a data sample set $r_p^{(k)}(j)$ (j=1,2,3, ... $N_s$) for each of a plurality of different values of sample timing k;
  iv. a reference symbol storage unit for providing a set of stored reference symbols s(n) (n=1,2,3, ... $N_p$);
  v. a synchronizer coupled to the reference symbol storage unit, and the A/D converter for estimating channel impulse response (CIR) coefficients $c_i$ (where i is from 1 to the channel tap length, L), creating a set of estimated reference symbols $\hat{r}^{(k)}(n)$ (n=1,2,3, ... $N_p$) from the set of stored reference symbols s(n) and the CIR coefficients $c_i$, selecting a plurality of values for sample timing k, and determining a sample timing b and a selected set of samples $r_{pre}^{(b)}(n)$ corresponding to sample timing b, which minimizes error between the estimated reference symbols $\hat{r}^{(b)}(n)$ and the selected set of samples $r_{pre}^{(b)}(n)$;
  v. a decoder for receiving and decoding the data sample set $r_{sp}^{(b)}(j)$ from the synchronizer into digital information; and
  vi. an output device for utilizing the digital information.

2. The digital communication system of claim 1 wherein the synchronizer comprises:
 a) a buffer for storing the received reference sample sets $r_{pre}^{(k)}(n)$ and the data sample sets $r_{sp}^{(k)}(j)$;
 b) a frame synchronizer coupled to the buffer and the reference symbol storage unit, the frame synchronizer for determining a coarse sample timing $\tilde{b}$;
 c) a channel estimator coupled to said reference symbol storage unit, the frame synchronizer and the buffer, for determining channel impulse coefficients $c_i$ from the stored reference symbols s(n), the coarse sample timing $\tilde{b}$ and the received reference sample sets $r_{pre}^{(k)}(n)$;
 d) a reference symbol estimator coupled to the channel estimator and the reference symbol storage unit, for determining an estimated received symbol set $\hat{r}^{(k)}(n)$;
 e) a timing selection unit for receiving the coarse sample timing $\tilde{b}$ from the frame synchronizer, the estimated received symbol set $\hat{r}^{(k)}(n)$ from the reference symbol estimator and selecting a received reference sample set $r_{pre}^{(k)}(n)$ from the buffer for a sample timing k, comparing the estimated received symbol set $\hat{r}^{(k)}(n)$ to the received reference sample set $r_{pre}^{(k)}(n)$ to determine a difference, and iteratively comparing sets at different sample timing values k to determine the best sample timing b corresponding to a lowest error; and f) a data selection unit for selecting a data sample set $r_{sp}^{(b)}(j)$ from the buffer corresponding to the best sample timing b from the timing selection unit.

3. The digital communication system of claim 1 wherein the receiver further comprises:
   a) a frequency offset means coupled to the synchronizer, for determining a frequency correction signal encoding a frequency drift between the transmit clock and the receive clock; and
   b) a frequency correction means coupled to the synchronizer and the frequency offset means and for subtracting the frequency correction signal from the received data sample set $r_{sp}^{(b)}(j)$ to produce a corrected data sample set $r_{sp}^{(b,\Delta\phi)}(j)$ which is provided to the decoder in place of data sample set $r_{sp}^{(b)}(j)$ for decoding into digital information.

4. The digital communication system of claim 3 wherein the frequency offset means comprises:
   a) a phase locked loop coupled to the synchronizer for producing an angular offset signal $\omega(n)$ for a set of reference symbols; and
   b) an averager coupled to the phase locked loop, for averaging the angular offset signal $\omega(n)$ obtained from an $m^{th}$ reference set over a period of time, and for producing a frequency offset signal $\Delta\phi(m)$ for use as the frequency correction signal.

5. The digital communication system of claim 4 wherein the averager determines the frequency offset signal $\Delta\phi(m)$ for an mth set of reference symbols according to the equation:

$$\Delta\hat{\phi}(m) = \frac{1}{N_p - N_1 + 1} \sum_{n=N_1}^{N_p} \omega(n).$$

where $N_p$ is the number of reference symbols in the $m^{th}$ set, $N_1$ is an integer less than $N_p$ being the number of symbols skipped at the beginning of the mth reference symbol set allowing the phase locked loop to stabilize.

6. The digital communication system of claim 4 further comprising a phase logic means coupled to the averager, for providing a smoothed frequency offset $\Delta\hat{\phi}_s(m)$ for an $m^{th}$ set of reference symbols to be used in place of the frequency offset signal $\Delta\phi(m)$ and frequency correction signal of claim 4 described by the equation:

$$\Delta\hat{\phi}_s(m) = \Delta\hat{\phi}_s(m-1) + s(m)(\Delta\hat{\phi}(m) - \Delta\hat{\phi}_s(m-1)),$$

where
$\Delta\hat{\phi}_s(m-1)$ is the average frequency offset of the (m−1)th set of reference symbols,
s(m) is a weighting coefficient determined by $s(m) = s(s_0, \lambda^m)$ the maximum of $(s_0, \lambda^m)$, where s(m) is the larger of $s_0$ or $\lambda^m$, wherein $s_0$ is a constant representing a predetermined minimum threshold value, $\lambda$ is a constant representing a degree of smoothing desired, and m is a slot index, and the equation is initialized by setting $\Delta\hat{\phi}_s(0)=0$ and $\Delta\hat{\phi}_s(-1)=0$.

7. The digital communication system of claim 4 further comprising a phase logic means coupled to the averager, for providing an averaged signal by averaging a first frequency offset $\Delta\hat{\phi}_1(m)$ obtained from a first set of reference symbols and a second frequency offset $\Delta\hat{\phi}_2(m)$ obtained from a second set of reference symbols to result in an averaged frequency signal to be used in place of the frequency offset signal $\Delta\phi(m)$ and frequency correction signal of claim 4.

8. The digital communication system of claim 4 wherein the averager comprises:
   a) calculating means for determining a first frequency offset $\Delta\hat{\phi}_1(m)$ obtained for an mth set of reference symbols according to the equation:

$$\Delta\hat{\phi}_s(m) = \Delta\hat{\phi}_s(m-1) + s(m),$$

where
   $\Delta\hat{\phi}_s(m-1)$ is the average frequency offset of the (m−1)th set of reference symbols,
   s(m) is the maximum of $(s_0, \lambda^m)$ where s(m) is the larger of $s_0$ or $\lambda^m$, wherein $s_0$ is a constant representing a predetermined minimum threshold value, and $\lambda$ is a constant representing a degree of smoothing desired, and m is a slot index, and the equation is initialized by setting $\Delta\hat{\phi}_s(0)=0$ and $\Delta\hat{\phi}_s(-1)=0$, and said calculating means also for determining a second frequency offset calculated in the same way as the first frequency offset but from a second set of reference symbols; and
   b) the frequency offset means further comprises a phase logic means for:
   computing a smoothed frequency offset $\Delta\hat{\phi}_s(m)$, and for selecting one of the first or second frequency offsets being closest to the smoothed frequency offset $\Delta\hat{\phi}_s(m)$ to be used in place of the frequency correction signal of claim 4.

9. The digital communication system of claim 4 wherein the frequency offset means further comprises a phase logic means coupled to the averager, for determining channel coefficients $c_{i1}$, $c_{i2}$ by comparing the first and second set of reference symbols to the stored reference symbols s(n), respectively, and for providing a frequency correction signal, (freq. corr.), according to the following equation:

$$\text{freq. corr.} = \Delta\hat{\phi}(m) = \begin{cases} \Delta\hat{\phi}_1(m), & \text{if } \sum_{i=1}^{L} |c_{i1}|^2 \geq \sum_{i=1}^{L} |c_{i2}|^2 \\ \Delta\hat{\phi}_2(m), & \text{otherwise.} \end{cases}$$

$$\Delta\hat{\phi}_1(m) = \frac{1}{N_p - N_1 + 1} \sum_{n=N_1}^{N_p} \omega_1(n),$$

where $$\Delta\hat{\phi}_2(m) = \frac{1}{N_p - N_1 + 1} \sum_{n=N_1}^{N_p} \omega_2(n),$$

$\omega_1(n)$, $\omega_2(n)$ is an angular offset signal obtained from the phase locked loop for a first and second set of reference symbols, respectively, m is a slot index, $N_1 - 1$ is a predetermined number of initial symbols discarded to ensure the phase locked loop has reached a stable signal and $N_p$ is a number of reference symbols in the reference sets.

* * * * *